(12) United States Patent
Girotto et al.

(10) Patent No.: US 6,763,928 B2
(45) Date of Patent: Jul. 20, 2004

(54) BOTTLE ALIGNMENT APPARATUS

(75) Inventors: Luigi Girotto, Spresiano (IT); Matteo Zoppas, Fontanafredda (IT)

(73) Assignee: Sipa S.p.A., Vittorio Veneto (IT)

( * ) Notice: Subject to any disclaimer, the term of this patent is extended or adjusted under 35 U.S.C. 154(b) by 0 days.

(21) Appl. No.: 10/221,015

(22) PCT Filed: Feb. 13, 2001

(86) PCT No.: PCT/EP01/01574
§ 371 (c)(1),
(2), (4) Date: Nov. 4, 2002

(87) PCT Pub. No.: WO01/66445
PCT Pub. Date: Sep. 13, 2001

(65) Prior Publication Data
US 2003/0113172 A1 Jun. 19, 2003

(30) Foreign Application Priority Data
Mar. 9, 2000 (IT) .................................. PN2000A0016

(51) Int. Cl.[7] .............................................. B65G 47/24
(52) U.S. Cl. ................... 198/411; 198/415; 198/803.14
(58) Field of Search ................................ 198/411, 415, 198/803.14, 803.15; 425/538, 534, 253, 452, DIG. 117, DIG. 118

(56) References Cited

U.S. PATENT DOCUMENTS

| | | | |
|---|---|---|---|
| 2,723,743 A | * 11/1955 | Carter ......................... 198/411 |
| 4,304,543 A | 12/1981 | Rolniczak et al. |
| 4,561,534 A | * 12/1985 | Nalbach ...................... 198/411 |
| 5,484,052 A | * 1/1996 | Pawloski et al. ...... 198/803.14 |
| 5,701,726 A | * 12/1997 | Smith ......................... 198/415 |
| 5,769,203 A | * 6/1998 | Marti Sala ............. 198/803.14 |
| 6,068,110 A | * 5/2000 | Kumakiri et al. ...... 198/803.14 |
| 6,176,369 B1 | * 1/2001 | Petrovic ................. 198/803.14 |

FOREIGN PATENT DOCUMENTS

| | | |
|---|---|---|
| DE | 2427818 | 1/1976 |
| EP | 0589383 | 3/1994 |
| GB | 1206363 | 9/1970 |

* cited by examiner

Primary Examiner—Joseph E. Valenza
(74) Attorney, Agent, or Firm—Wenderoth, Lind & Ponack, L.L.P.

(57) ABSTRACT

Apparatus for the alignment of a plurality of bottles whose body is in the shape of a parallelepiped, and which are furthermore oriented in such a manner that said bottles are provided with respective axes centered on to the respective mouth, and the respective walls are inclined at either acute or obtuse angles with respect to the plane passing through said axes, in which there is provided a structure comprising two comb-like members (10, 11) and plurality of cylindrical cups (26) inserted in appropriate housings provided between said comb-like members (10, 11), wherein said cups (26) hold respective bottles (3) and are made in such a manner as to ensure that the corners of the bottles (3) are capable of being arranged in contact with the inner surface of said cups; said surface is in the shape of a plurality of plane surfaces spaced from each other by configurations in the shape of an arc of a circle having a radius (R) that is equal to the inner radius of the cups (r).

7 Claims, 11 Drawing Sheets

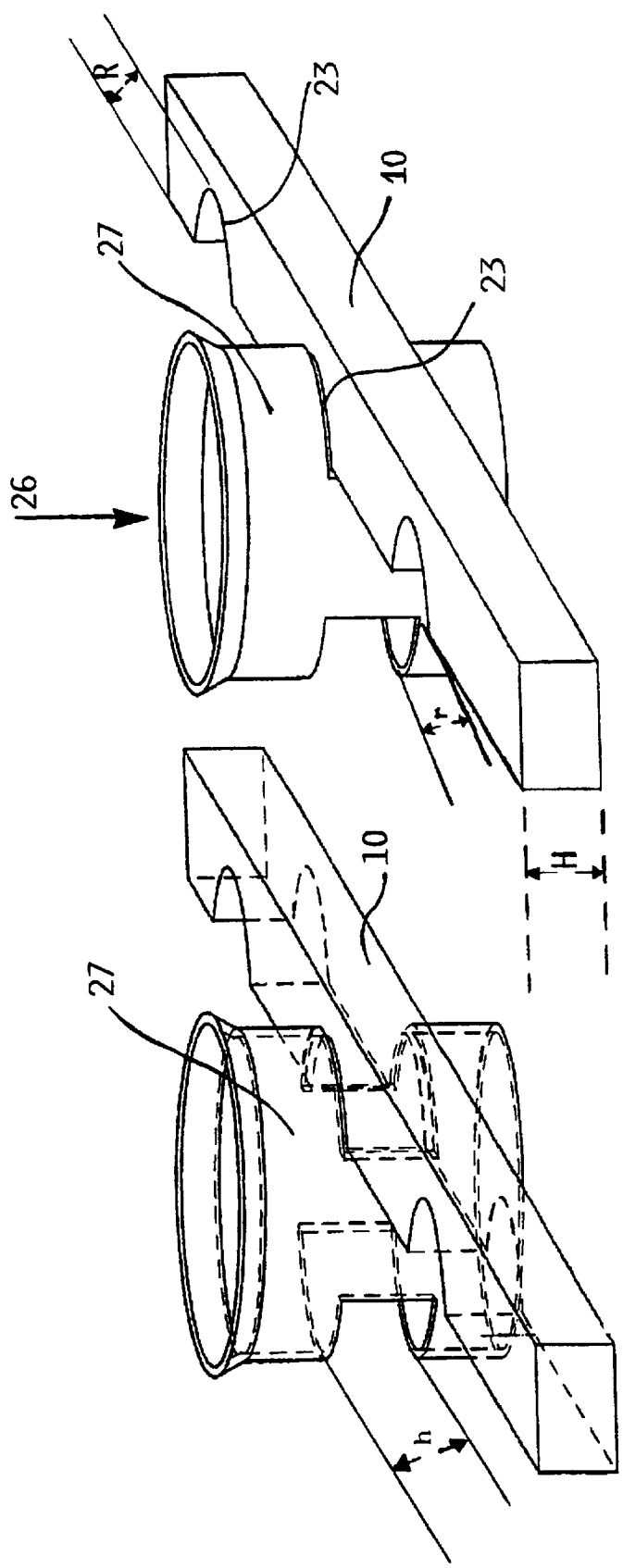

BOTTLE ALIGNMENT APPARATUS

DESCRIPTION

BACKGROUND OF THE INVENTION

The present invention refers to a high-productivity apparatus for the orientation at a very fast rate of hollow plastic articles, in particular bottles, which have not a circular form, but have instead their body in the shape of a parallelepiped with a rectangular cross-section. In particular, the present invention applies in a preferred manner to the working steps that follow a phase of simultaneous blow moulding of a plurality of bottles with a rectangular cross-section.

Automatic plants for the production of hollow plastic bodies are known in the art to comprise a section in which preforms are preliminarily produced, and a section in which the preforms are then blow moulded into the final product.

Generally known in the art is also the possibility for the two sections to be either physically and functionally integrated into a single plant, which is then called a "single-step" plant, or physically and functionally subdivided into two distinct, autonomous plants, in which case reference is usually made to "two-step" plants and processes.

The difference existing between single-step and two-step machines, along with the description thereof, is well-known to all those skilled in the art, so that it shall not be described or explained here any further.

The present invention applies to that section of a plant and that process that are solely used to blow mould, and therefore convert into a finished product, a previously produced preform, regardless of whether such a section belongs to a single-step plant or a double-step one.

In the production of plastic containers, especially bottles intended for use in the most varied applications, use is increasingly being made of a particular kind of bottle, i.e. bottles whose body is in the shape of a parallelepiped having a horizontal cross-section, with respect to the resting plane of the bottle, in the shape of a rectangle.

During the blow moulding operation, the above cited bottles are brought into a side-by-side arrangement, as illustrated in FIG. 1, and they are all oriented in such a manner as to ensure that the pairs of opposite walls of each bottle are either parallel or orthogonal to the plane passing through all axes of the bottles.

This solution, however, is connected with two particular kinds of drawbacks. First of all, if the case is faced which involves the presence of contours with undercuts on the walls, it becomes really difficult, and sometimes even impossible, to succeed in obtaining a smooth release of such walls from the mould, owing also to a kind of "sticking" effect that is particularly evident when the contact surface between mould and bottle is flat, i.e. plane, as in the case being considered here. In such a case, in fact, the whole extent of cohesive forces existing between bottle and mould must be overcome with an orthogonal release force and, therefore, with a maximum effort, although concentrated in a very short time. However, such a maximum effort cannot be available from the plant and this creates a number of evident technical and production-related problems.

The second drawback relates to the size of the blow moulding plant. Looking again at FIG. 1, it can quite easily be inferred that, if the bottles are in a rather large number and their major side is rather wide, then, owing to these bottles having to be brought into a side-by-side arrangement, they impose a correspondingly large size on the blow-moulding mould, with further problems as far as tightness, strength, rigidity, and control of the handling organs are among other things of concern, as those skilled in the art are well aware of.

Based on the above considerations, it is therefore desirable, and it is actually a main purpose of the present invention, to provide a plant and a respective process which are adapted to implement and carry out the blow-moulding phase of the described type, while doing away with the above mentioned kind of drawbacks, being fully reliable and capable of being easily implemented using readily available and, therefore, cost-effective materials and techniques.

Such an aim of the present invention, along with further features thereof, is reached in a plant and a process that are implemented and operate as recited in the appended claims.

BRIEF DESCRIPTION OF THE DRAWINGS

The present invention may take the form of a preferred, although not sole embodiment such as the one that is described in detail and illustrated below by way of non-limiting example with reference to the accompanying drawings, in which:

FIGS. 7a and 7b are perspective and see-through views, respectively, of the mutual engagement of two apparatuses according to the present invention;

DETAILED DESCRIPTION OF THE PREFERRED EMBODIMENTS

Figure 1:
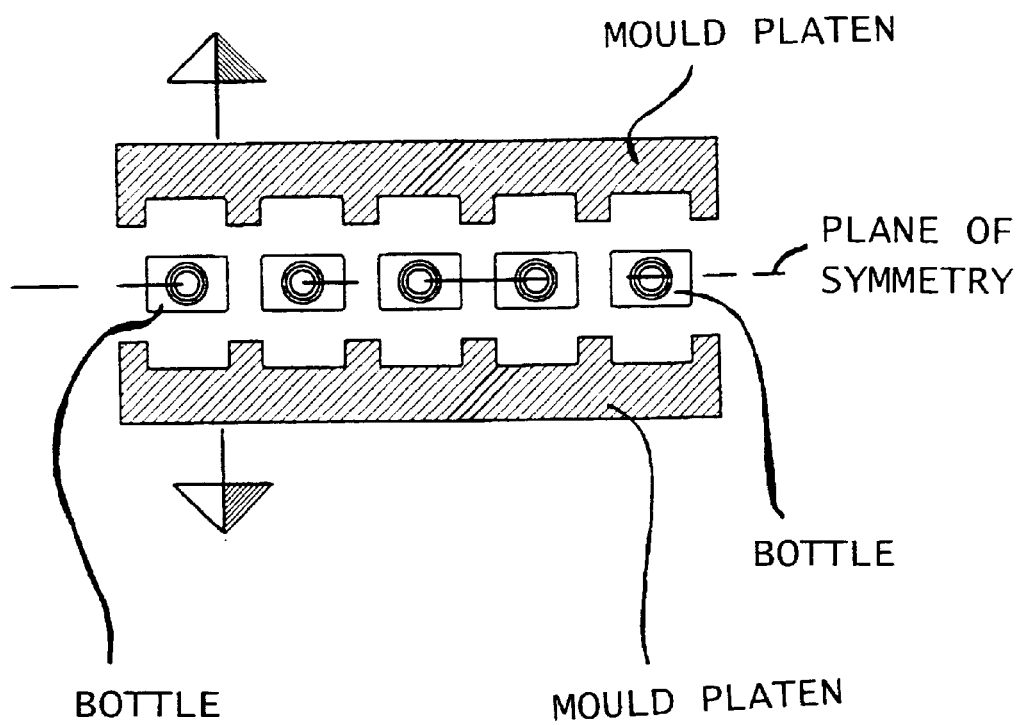
FIG. 1 is a top view of a blow moulding plan.
Figure 2:
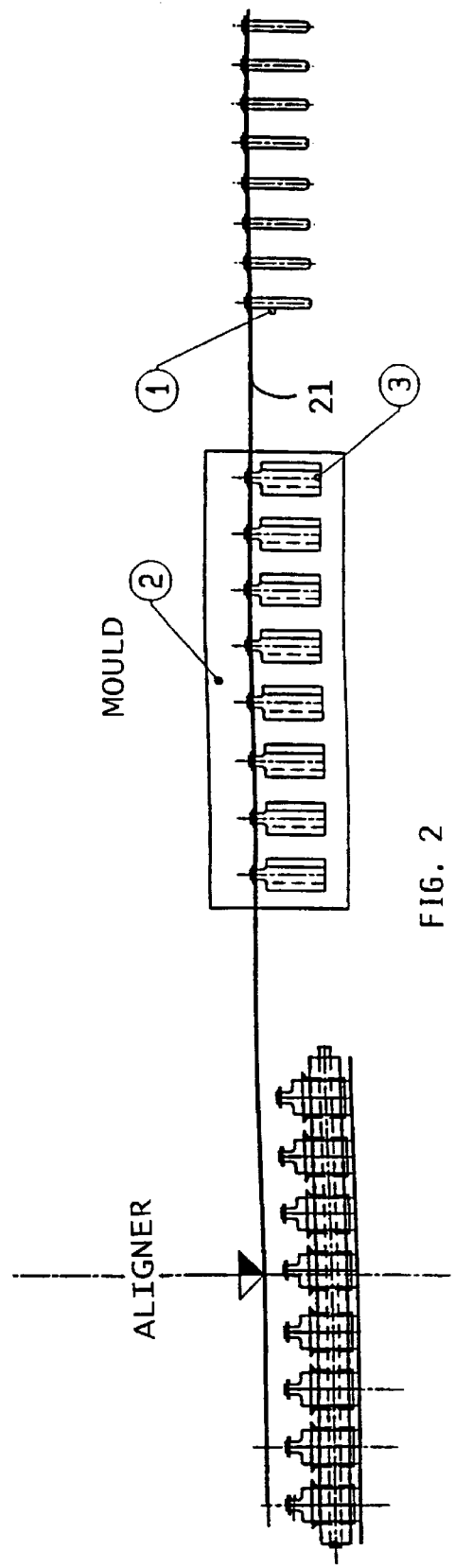
FIG. 2 is a symbolical side view of a blow moulding plant.
Figure 3:
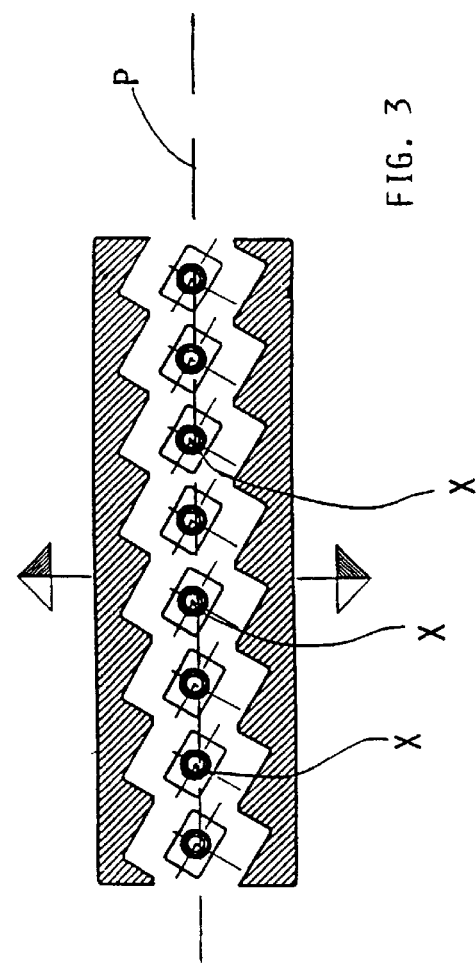
FIG. 3 is a top view of the blow moulding dies in their open state and the arrangement of the bottles according to a modality considered by the present invention.
Figure 5B:
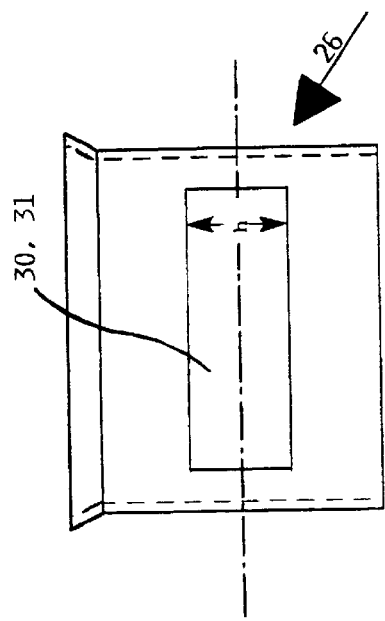
FIGS. 5a and 5b are views corresponding to those illustrated in FIGS. 4a and 4b, with the same component part viewed from an orthogonal position on the horizontal plane.
Figure 5A:
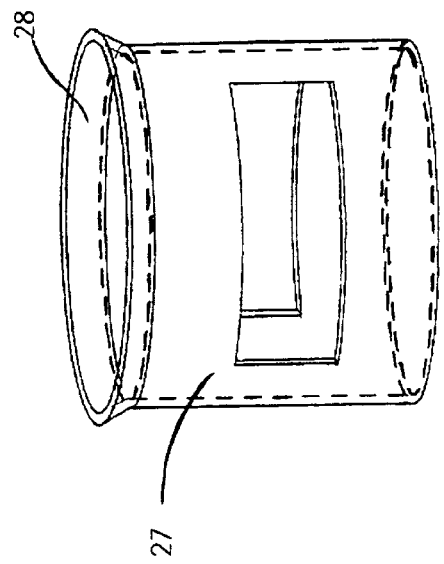

With reference to FIG. 2, a prior-art blow moulding plant comprises a conveying line 21 for transferring a plurality of preforms 1 into a blow moulding die 2. When exiting such a die 2, the bottles that have been just blow moulded and put into an alignment such as illustrated in FIG. 3, i.e. with their side walls oriented at an angle with respect to the plane "P" passing through the respective axes "X" centered in the respective mouth portions, are transferred to an alignment mechanism that is assigned the task of orienting all such bottles as illustrated symbolically in FIG. 1, i.e. in such a manner as to ensure that the pairs of opposite walls of each bottle are either parallel or orthogonal to said plane "P".

The above cited mechanism substantially comprises a pair of mutually opposing, symmetrical comb-like members 10, 11 and a plurality of identical cup-like members, hereinafter called simply "cups" 26, which are adapted to be inserted in appropriate seats or housings between the comb-like members. This shall be explained in greater detail further on.

Figure 6A:
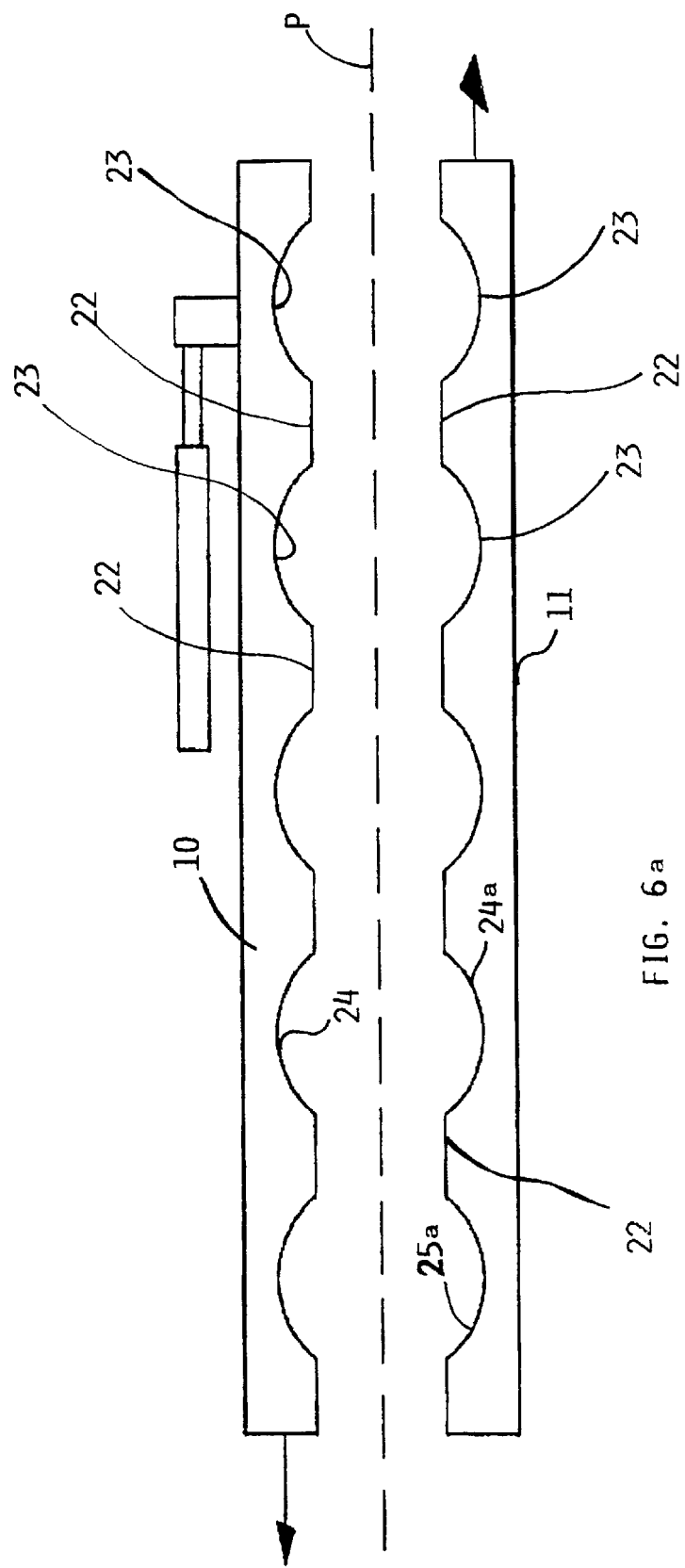
FIGS. 6a and 6b are views of two apparatuses of a plant according to the present invention in two distinct operating states thereof.

With reference to FIGS. 6a through to 13, each one of the comb-like members 10, 11 is an elongated structure, while the side of each such comb-like member facing the opposite comb-like member is provided with a sequence of a plurality of plane surfaces 22 that are regularly spaced from each other by configurations 23 in the shape of an arc of a circle with a radius R equal to the inner radius of the cups.

Figure 9:
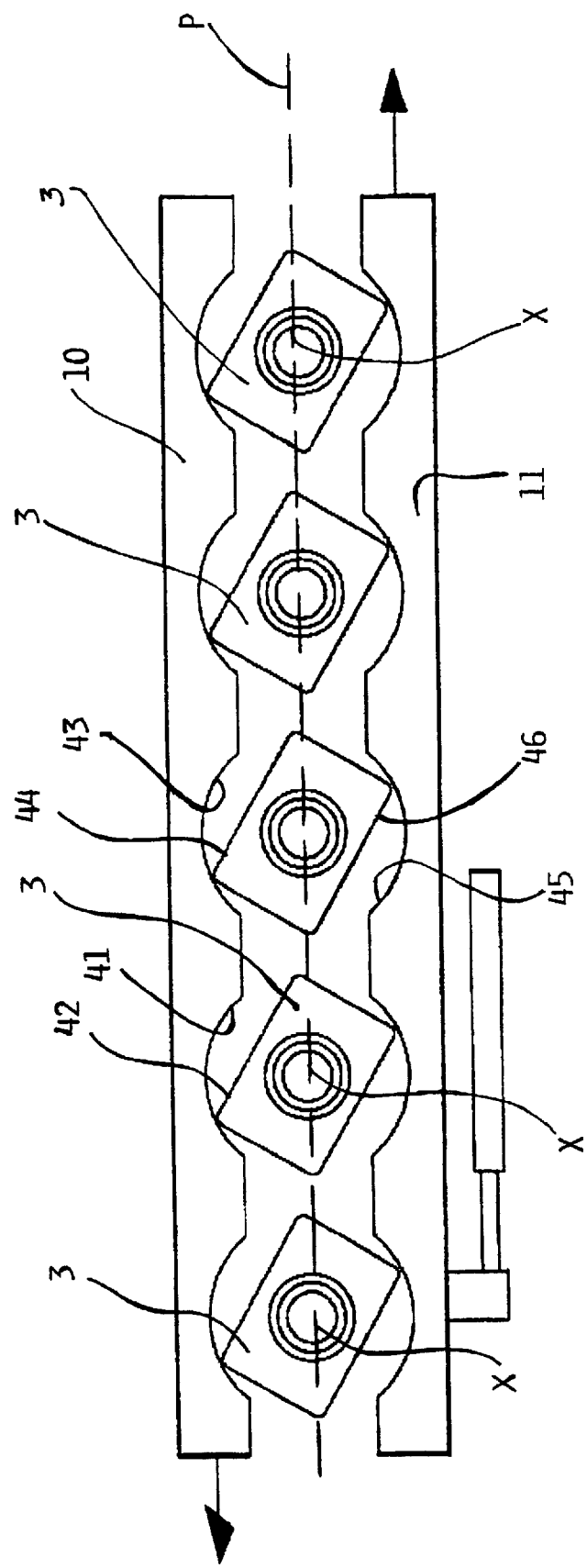
FIGS. 9 and 10 are respective top views of a plant according to the present invention, which is shown deprived of some of its apparatuses (cups) to provide for better visibility of the structure.

The plane surfaces and the configurations have the same overall size and the same distribution along the comb-like members, respectively, as can be clearly seen for instance from the illustrations in FIGS. 6a and 9.

As already indicated above, these comb-like members are symmetrical structures with respect to a plane of symmetry that, as this will be better explained further on, coincides with the plane "P" (see FIG. 6a).

Figure 6B:
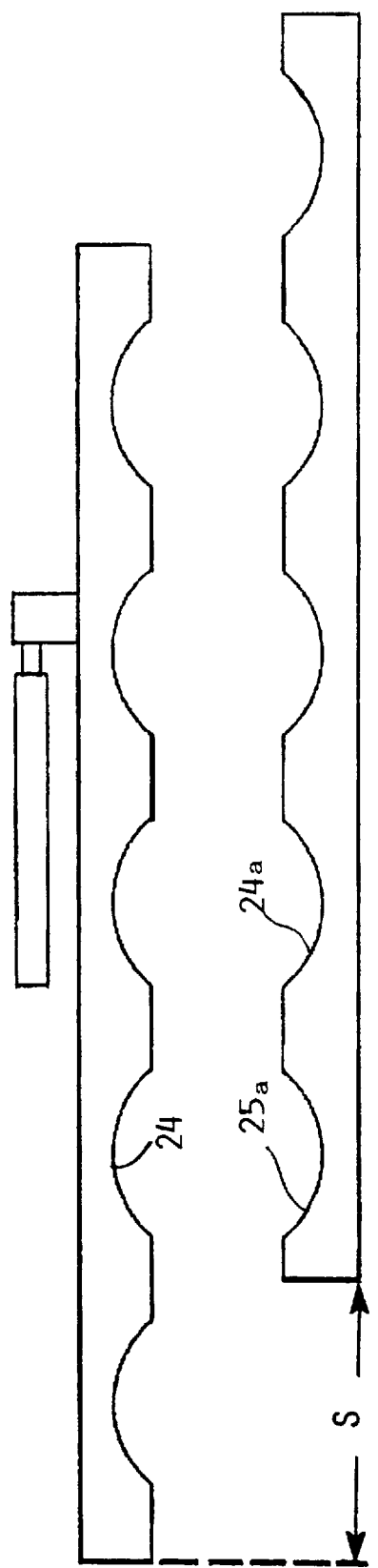

These comb-like members are adapted to be mutually displaced with respect to each other through a rectilinear translational movement until they move into the position illustrated in FIG. 6b.

With reference to FIGS. 6a and 6b, the actual extent of a displacement "S" is such as to ensure that a particular configuration 24 provided in the comb-like member 10, initially opposing a respective configuration 24a provided in the comb-like member 11, will find itself opposing exactly a configuration 25a adjacent to the configuration 24a on the same cup 26 after the displacement.

Figure 4B:
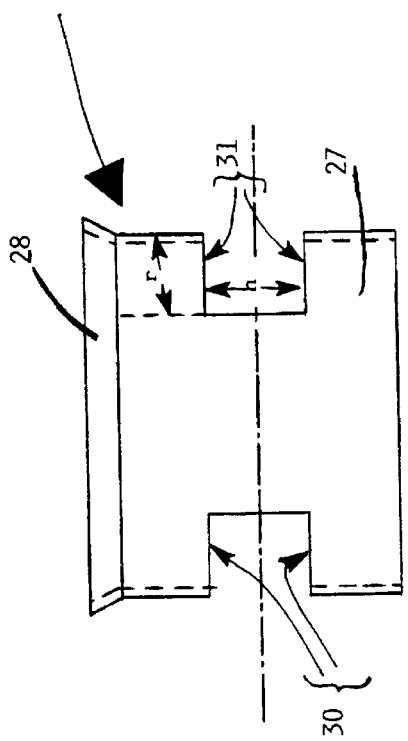
FIGS. 4a and 4b are a perspective view and a cross-sectional view, respectively, of a component part of a plant according to the present invention.
Figure 4A:
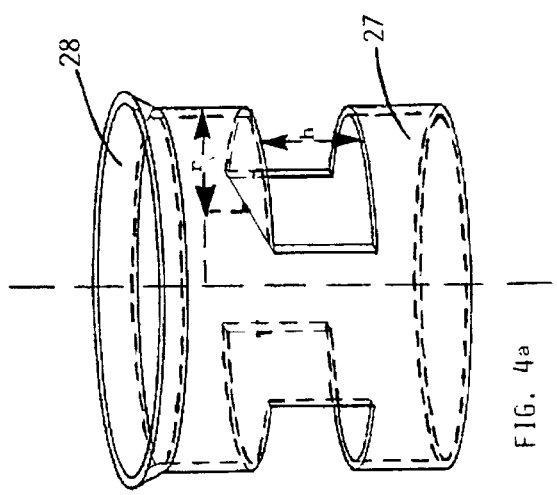

As illustrated in FIGS. 4a through to 5b, there are provided a plurality of identical cups 26 formed by a central cylindrical body 27, a possible upward oriented flared portion 28 to better accommodate and center the related bottle therein, and a pair of symmetrical apertures 30, 31 provided in mutually opposing positions on the same body 27.

The shape of these apertures is such that, if the cylinder of the cup is developed on a plane, each aperture would appear as a regular rectangle. Each one of these apertures has a height "h" in the direction of the axis of the cup, and a radial depth "r" measured in the radial direction starting from the outer wall of the cup.

Figure 13:
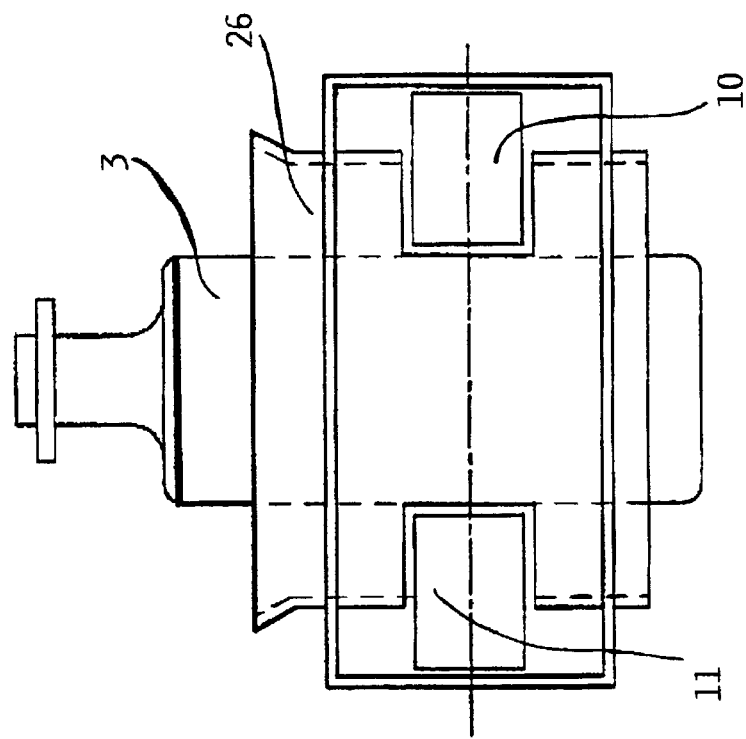
FIGS. 13 and 14 are views from "A" of the illustrations in the respective FIGS. 11 and 12.

FIGS. 7a, 7b and 13 illustrate, including in a perspective view and a perspective see-through view, the kind of engagement between one of the cups 26 and one of the comb-like members 10.

It will of course be appreciated that the kind of engagement between the other comb-like member (not shown) and a corresponding cup is fully symmetrical to the one illustrated in the above cited Figures, so that it is not shown here.

It should be noticed, in the above mentioned Figures, that:
the cup 26 is capable of being partially inserted in any of the configurations 23;
the radius of the configurations is furthermore equal to the radius of the cup;
the height "H" of the comb-like member 10 is slightly smaller than the height "h" of the apertures on the outer surface of the cups, as has already been explained; and
the radial depth "r", as defined above, is substantially similar to or slightly greater than the depth "R" of the configurations 23 with respect to the plane surfaces 22.

Figure 8:
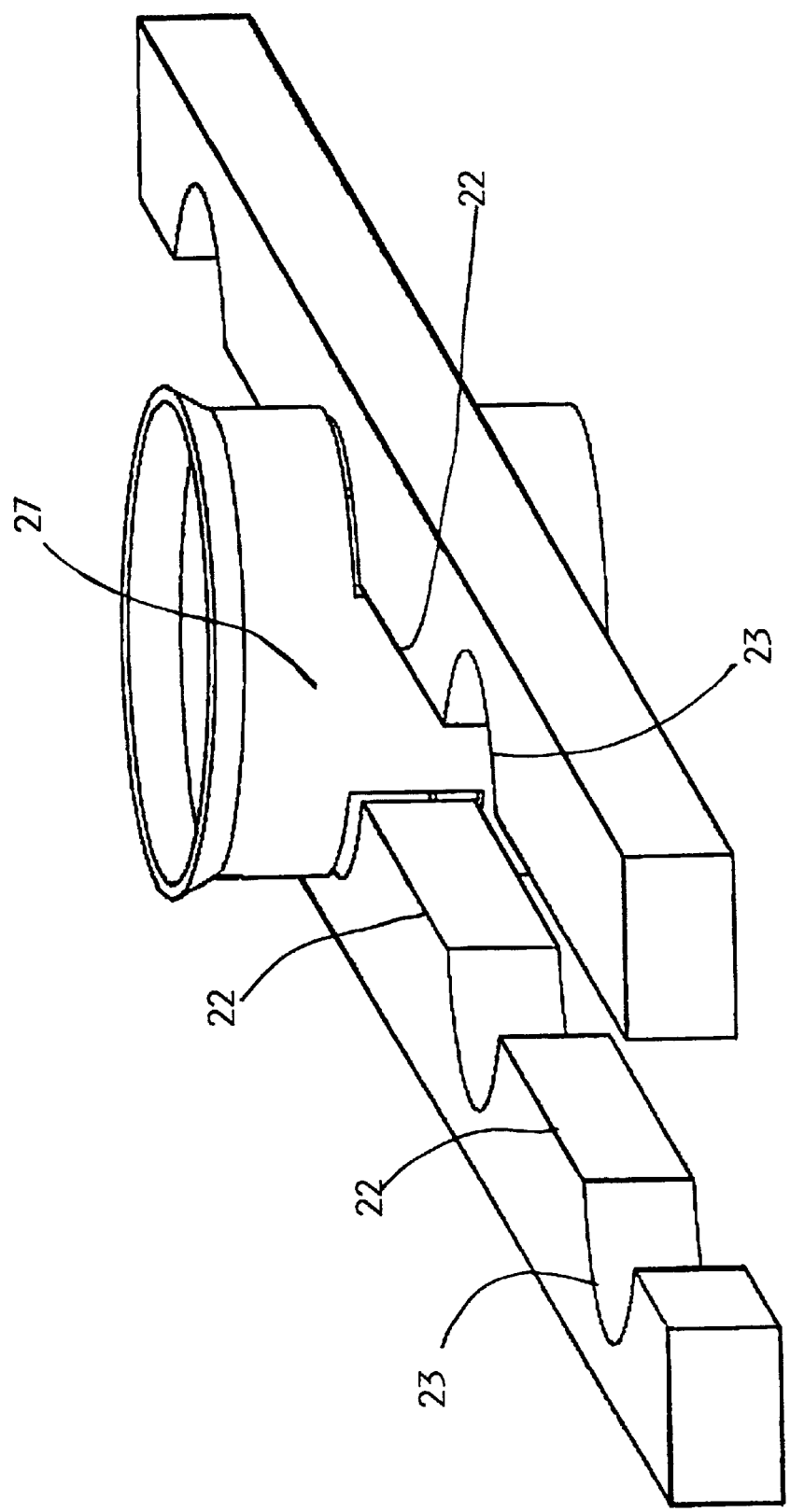
FIG. 8 is a perspective view of a mode of mutual engagement of the apparatuses according to the present invention.

Given the above cited conditions and constructive contrivances, and with particular reference to FIG. 8 which illustrates by way of example the application of a single cup, it is possible for a plurality of the cups 26 to be inserted in the seats or housings that are capable of being formed by the semi-circular configurations when they are arranged in front of each other in the respective comb-like members.

With reference to FIG. 9, a top view can be observed there of an assembly formed by:
the two comb-like members 10 and 11, as correctly mounted in an initial position thereof, and
the plurality of bottles 3 in the position they take at the moment of their insertion. In the above cited Figure, the cups 26, which are anyway necessary, have been omitted for the sole purpose of more effectively showing the mutual position of bottles and comb-like members.

Figure 11:
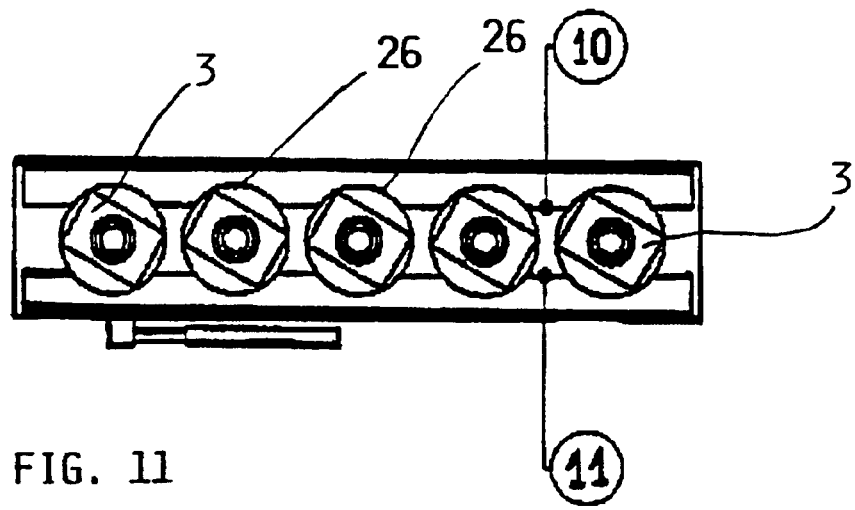
FIGS. 11 and 12 are views corresponding to the ones of FIGS. 9 and 10, however with the apparatuses (cups) regularly installed.

With reference to FIG. 11, this can be seen to correspond to FIG. 9, with the sole difference being that the cups have in this case been indicated correctly.

FIG. 10 represents again the situation illustrated in FIG. 9, with the sole difference being that, in this case, the two comb-like members 10 and 11 are caused to translate so as to align the bottles as shown in the Figure. This will be described in greater detail further on.

Figure 12:
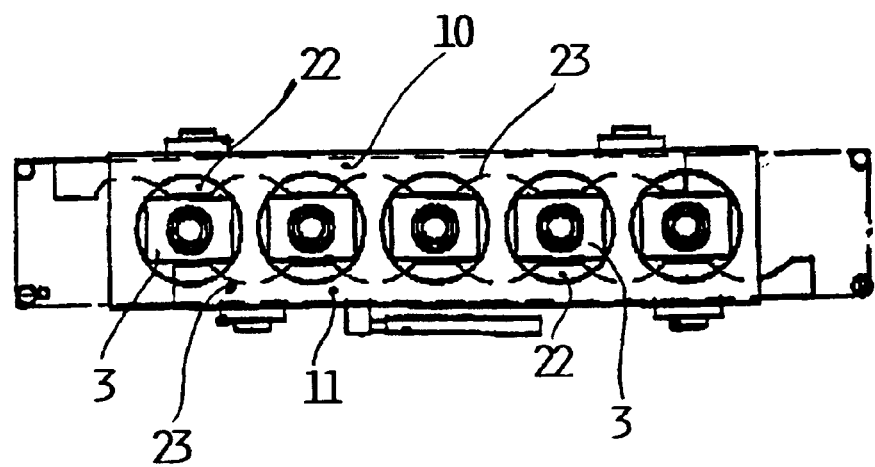

Similarly, FIG. 12 represents again the situation illustrated in FIG. 11, with the sole difference that, in this case, the two comb-like members 10 and 11 are caused to translate so as to align the bottles as shown in the Figure. This will be described in greater detail further on.

The operation of the described apparatuses is as follows:
In a first phase the bottles, as released from the blow moulding dies and arranged as shown in FIG. 3, are picked up and inserted in the respective cups, usually with the use of known means that are adapted to at the same time transfer the bottles, while maintaining the mutual orientation and position thereof, as is shown in FIGS. 9 and 13. At the end of this operation, the assembly so formed by the bottles, the cups and the comb-like members is arranged as illustrated in FIG. 11.

In a second phase, the two comb-like members are caused to translate and displace relative to each other by a distance "S" so as to bring them from the position illustrated in FIG. 6a to the position illustrated in FIG. 6b. Due to the effect of such displacement, and with particular reference to FIG. 9, the corner 41 of the related configuration of the comb-like member 10 enters into contact with and pushes the side 42 of the respective bottle, and so on for the other bottles, in the sense that the corner 43 of the respective configuration of the comb-like member 10 enters into contact with and pushes the side 44 of the adjacent bottle, on which also the corner 45 acts on the opposite side against the side 46 thereof, and so on.

As a matter of fact, the direct contact of the corners with the related bottles is enabled to occur by the afore mentioned circumstance that the size of the apertures 30 and 31 in the respective cups is such as to allow for the corners to penetrate into the cups and, as a result, to push the bottles and cause then to rotate without anyway causing the cups themselves to rotate.

Figure 10:
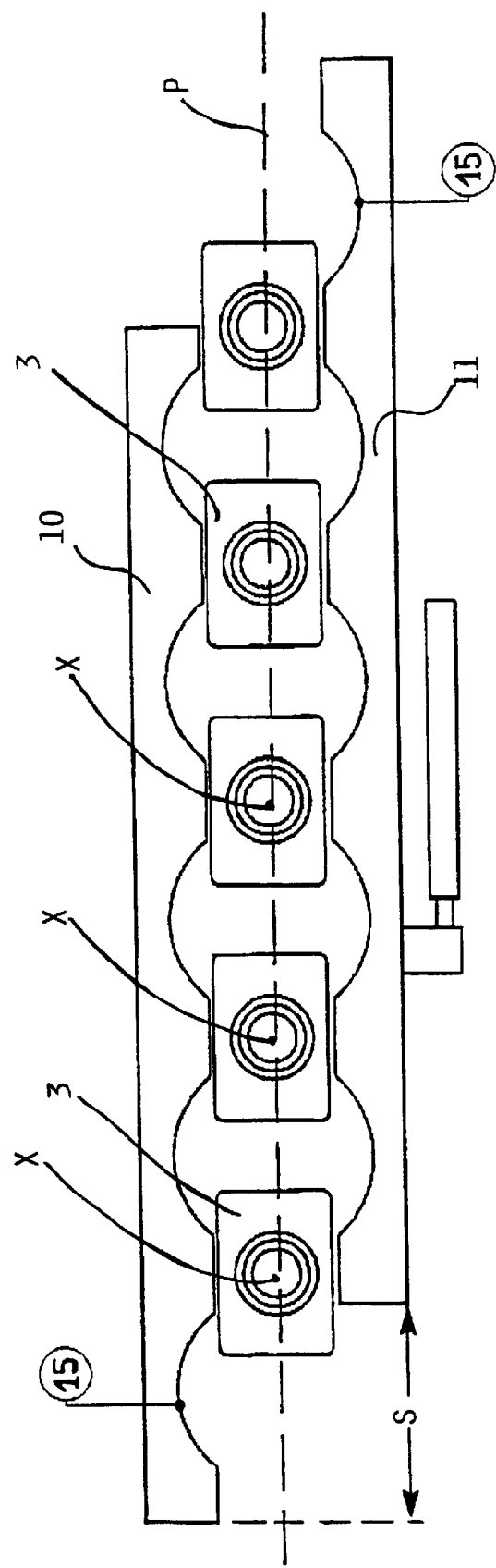
Figure 14:
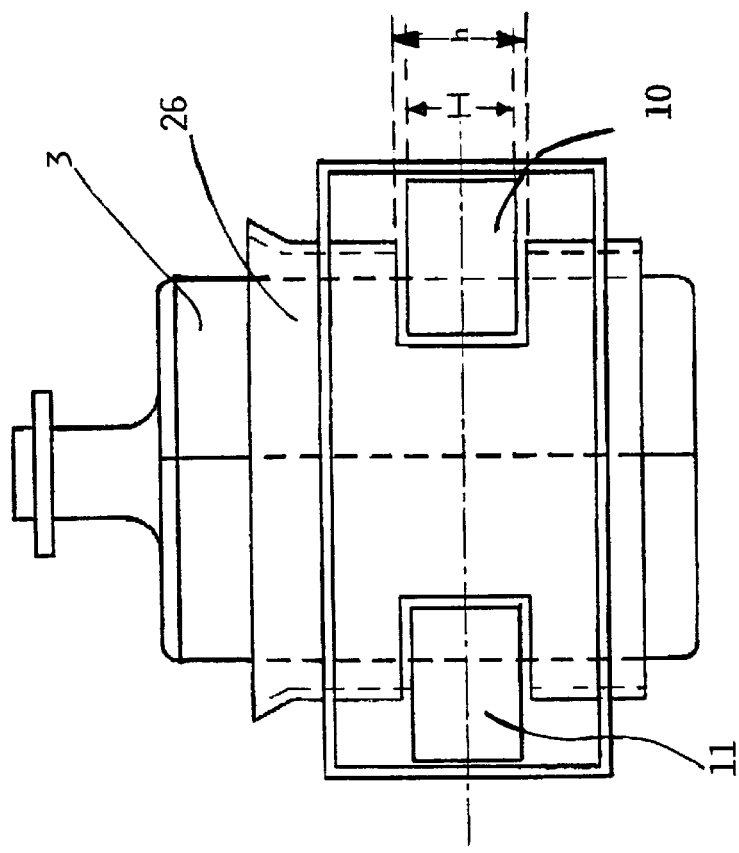

The overall effect of such an operation is illustrated in FIG. 10, in which there is illustrated that, at the end of the displacement by a length "S" of the comb-like members 10 and 11, the combined and symmetrical action of the corners of the configurations of both comb-like members causes the bottles to rotate synchronously until they move into the position of full alignment illustrated in FIG. 10, in which the cups have been omitted, and in FIG. 11 which on the contrary includes also the cups. Furthermore, the illustration in FIG. 14 may prove helpful in making still clearer the mutual position of the discussed component parts at the end of the phase of translational displacement (of the comb-like members) and resulting rotation of the bottles.

At this point, the bottle alignment operation can be considered to be concluded and the bottles themselves may therefore be picked up by any appropriate known means to be sent, with the desired alignment, to the subsequent processing or production phases.

It shall of course be appreciated that the above described means are to be intended as preferred ones and do not preclude the utilization of means of a different kind or nature to so orientate the hollow bodies, as far as they do not depart from the scope of the present invention as recited in the appended claims.

What is claimed is:

1. Apparatus for the alignment of a plurality of hollow bodies (3) having four side walls, in particular bottles whose body is in the shape of a parallelepiped, said hollow bodies being furthermore oriented in such a manner that:

said hollow bodies are provided with respective axes (X) centred on the respective mouth portion and parallel to the walls of the respective parallelepipeds, and the respective walls (42, 44, 46) are inclined at either acute or obtuse angles with respect to the plane (P) passing through said axes, characterized in that there is provided a structure comprising two comb-like members (10, 11) and a plurality of cups (26) in a substantially cylindrical shape inserted in appropriate housings obtained between said comb-like members, in which said cups are adapted to accommodate respective ones of said hollow bodies and are made in such a manner as to ensure that the corners of said hollow bodies are capable of being arranged in contact with the inner surface of said cups.

2. Apparatus according to claim 1, characterized in that the inner surface of said comb-like members is in the shape of a plurality of plane surfaces (22) spaced from each other by configurations (23) in the shape of an arc of a circle having a radius (R) that is equal to the inner radius of said cups.

3. Apparatus according to claim 2, characterized in that said cups are provided with respective pairs of opposite apertures (30, 31) arranged symmetrically with respect to the axis of the respective cup, in which said apertures are adapted to allow for the portions (41, 43, 45) of said comb-like members comprised between adjacent ones of said semi-circular configurations to slide and penetrate thereinto.

4. Apparatus according to claim 3, characterized in that said comb-like members are adapted to be selectively displaced relatively to each other by a definite displacement length (S) so that said portions thereof are capable of penetrating and sliding into the respective apertures so as to enter into contact with the respective hollow bodies, thereby causing them to rotate synchronically by a pre-defined angle inside the respective ones of said cups, in such a manner as to enable said hollow bodies to be invariably oriented in the same pre-defined manner at the end of said displacement.

5. Apparatus according to claim 4, characterized in that, when so oriented, the opposite and parallel sides of each hollow body are arranged either parallel to the plane (P) passing through said axes or orthogonal thereto.

6. Method for the alignment of a plurality of hollow bodies having four side walls, in particular bottles whose body is in the shape of a parallelepiped, said hollow bodies being furthermore oriented in such a manner that:

said hollow bodies are provided with respective axes (X) centred on the respective mouth portion and parallel to the walls of the respective parallelepipeds, and the respective walls are inclined at either acute or obtuse angles with respect to the plane (P) passing through said axes (X), characterized in that it comprises following phases:

a) insertion of said plurality of said hollow bodies in a plurality of respective cylindrical cups provided with respective apertures and arranged between two comb-like members that are opposing each other with respect to said cups, b) mutual displacement of said comb-like members relative to each other so that appropriate portions thereof are capable of penetrating into respective ones of said apertures and engaging said hollow bodies so as to orientate them in a synchronous manner.

7. Method according to claim 6, characterized in that the above cited phase b) goes on until the corresponding sides of several hollow bodies are oriented in such a manner as to be arranged on a same plane.

* * * * *